United States Patent [19]

Simon et al.

[11] Patent Number: 4,871,914

[45] Date of Patent: Oct. 3, 1989

[54] LOW-COST RADON DETECTOR

[75] Inventors: William E. Simon, Satellite Beach; Thomas L. Powers, Indian Harbor Beach; Glenn W. Ernsberger, Melbourne, all of Fla.

[73] Assignee: Sun Nuclear Corporation, Melbourne, Fla.

[21] Appl. No.: 46,933

[22] Filed: May 5, 1987

[51] Int. Cl.⁴ .................................... G01T 1/24
[52] U.S. Cl. ..................... 250/370.02; 250/370.01; 250/253
[58] Field of Search ............ 250/370.02, 435, 253, 250/370 R

[56] References Cited

U.S. PATENT DOCUMENTS

| | | | |
|---|---|---|---|
| 2,892,091 | 6/1959 | Sawle | 250/364 |
| 2,898,497 | 8/1959 | Cartmell et al. | |
| 3,336,477 | 8/1967 | Sharp | |
| 3,502,876 | 3/1970 | Lasseur | |
| 3,564,245 | 2/1971 | Koehler | 250/370 |
| 3,805,070 | 4/1974 | Auxier | 250/328 |
| 4,055,762 | 10/1977 | Durkin | 250/253 |
| 4,104,523 | 8/1978 | Wolfert | 250/370 |
| 4,140,912 | 2/1979 | Bressan et al. | 250/394 |
| 4,147,934 | 4/1979 | Tomimasu et al. | 250/370 |
| 4,255,660 | 3/1981 | Blundell et al. | 250/370 |
| 4,297,574 | 10/1981 | Card et al. | 250/253 |
| 4,301,367 | 11/1981 | Hsu | 250/370 |
| 4,352,014 | 9/1982 | Powell | 250/253 |
| 4,417,142 | 11/1983 | Malmquist | 250/253 |
| 4,426,575 | 1/1984 | Malmquist et al. | 250/253 |
| 4,468,558 | 8/1984 | Malmquist et al. | 250/253 |
| 4,469,945 | 9/1984 | Hoeberechts et al. | 250/370 |
| 4,484,076 | 11/1984 | Thomson | 250/370 |
| 4,489,315 | 12/1984 | Falk et al. | 340/600 |
| 4,499,377 | 2/1985 | Presser | 250/430 |
| 4,516,028 | 5/1985 | Riggan | 250/370 |
| 4,518,860 | 5/1985 | Alter et al. | 250/253 |
| 4,607,165 | 8/1986 | Burghoffer et al. | 250/435 |
| 4,704,537 | 11/1987 | Urban et al. | 250/253 |

FOREIGN PATENT DOCUMENTS 1773122 6/1971 Fed. Rep. of Germany.
0099630 6/1983 Japan.
952948 3/1964 United Kingdom.
1202197 8/1970 United Kingdom.

OTHER PUBLICATIONS

Kotrappa et al., "Passive Measurement of Radon and Thoron Using TLD or SSNTD on Electrets", *Health Physics*, vol. 43, No. 3, Sep. 1982, pp. 399-404.

Khan et al., "Electrets for Passive Radon Daughter Dosimetry", *Health Physics*, vol. 46, No. 1, Jan. 1984, pp. 141-149.

Bigu et al., "Passive Radon/Thoron Personal Dosimeter Using an Electrostatic Collector and a Diffused-Junction Detector", *Review of Scientific Instruments*, vol. 56, No. 1, Jan. 1985, pp. 146-153.

"Radon Reduction Techniques for Detached Houses", EPA/625/5-86/019, Jun. 1986, Report from the EPA Class 98/42.02, pp. 1-41.

(List continued on next page.)

*Primary Examiner*—Janice A. Howell
*Assistant Examiner*—William F. Rauchholz
*Attorney, Agent, or Firm*—Steele, Gould & Fried

[57] ABSTRACT

A low-cost radon detector using a solid state diode having a depletion layer disposed close enough to a test medium that alpha particles deposit their energy in the depletion layer. The signal produced by the diode is amplified and pulses are discriminated for levels over a threshold typical of pulse levels produced by radioactive decay of radon daughters on the surface of the sensor. More than one amplifier and threshold detector are provided, and the sensor can have plural solid state diodes. Pulses occurring exclusively on one channel are counted and pulses occurring in coincidence on more than one channel are ignored as instances of transient disturbance. A conductive enclosure around the sensor element can be biased to force radon daughter ions to plate out the sensor, whereupon decay of the daughters produces pulses falling closely into pulse height ranges well above the noise threshold. Pulse counts and time lapse are monitored both long term and short term.

26 Claims, 3 Drawing Sheets

OTHER PUBLICATIONS

*Health Physics*, vol. 50, No. 5 (May), pp. 645–646, 1986–Watnick et al.

"A Microprocessor Based Continuous Monitor with Alpha Spectroscopy Capabilities for the Determination of Radon, Thoron and Their Progeny", Bigu et al, *Radiation Protection Dosimetry*, vol. 12, No. 3, pp. 251–260, 1985.

"Radon-222 and Progeny Measurements in Typical East Tennessee Residences", Goldsmith et al, *Health Physics*, vol. 48, No. 1, pp. 81–88, 1983.

"Problems in Area Monitoring for Radon Daughters", Washington et al, *Proceedings of the Specialist Meeting on Personal Dosimetry and Area Monitoring . . .*, p. 239, 1976.

"A New Tiny Computerized Radiation Dosimeter"–Wolf et al., IEEE Transactions on Nuclear Science, vol. NS-29, No. 1, p. 773, 1972.

"Monitor for Airborne Alpha Particles"–Knowles, *Nucleonics*, vol. 13, No. 6, pp. 98–103, 1955.

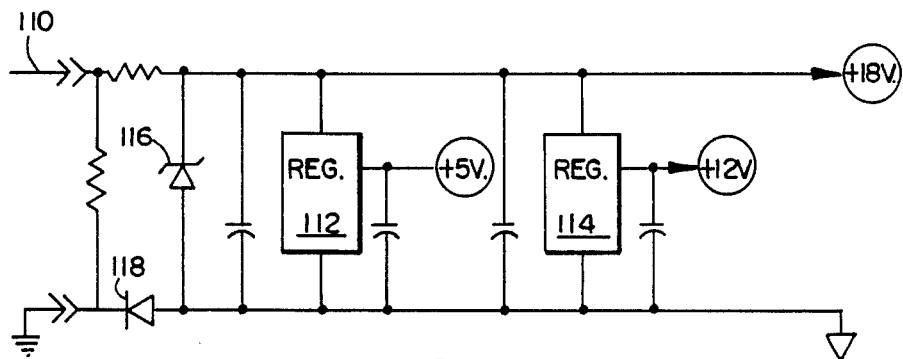
FIG. 3
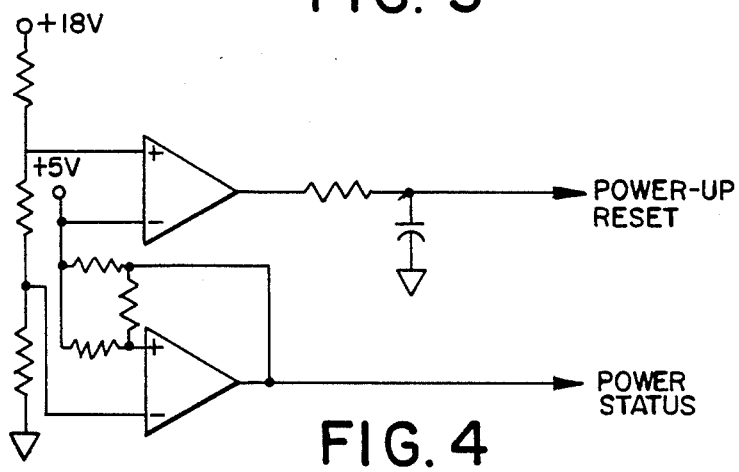
FIG. 4
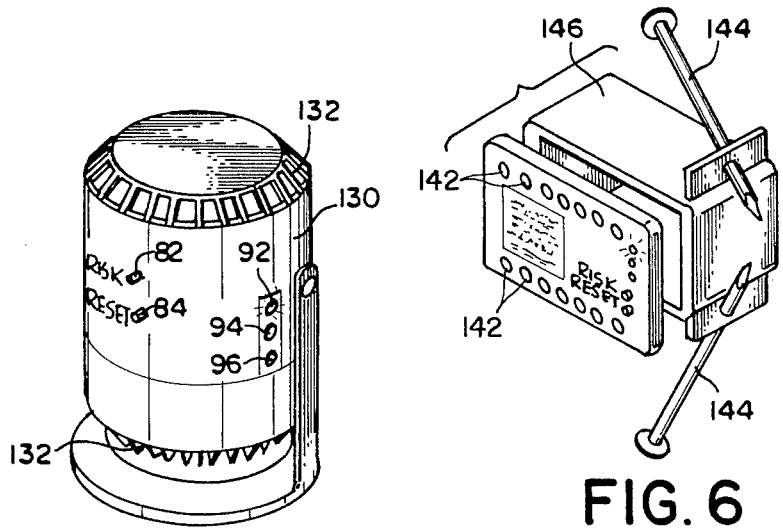
FIG. 5
FIG. 6

LOW-COST RADON DETECTOR

FIELD OF THE INVENTION

This invention relates to the field of alpha particle detectors, and in particular to a low-cost radon detector for use in residences and the like, operable to indicate ambient radon concentration over a predetermined threshold.

PRIOR ART

Radon and the products of radioactive decay of radon (i.e., radon "daughters") emit alpha particles during radioactive decay. Radon is a heavy radioactive stable gaseous element formed by decay of radium, and decays further into polonium, bismuth, and finally lead. The alpha particles (i.e., free helium nuclei, consisting of two protons and two neutrons) which are emitted in the decay process, are a form of ionizing radiation that can be hazardous to humans. Radon is a noble gas that can be dangerous due to its radioactive emissions. A greater danger is presented by radon daughters, which originate as metal ions and become affixed to airborne dust particles. During normal respiration, persons exposed to radon concentrations inhale dust with radon daughters affixed or "plated" thereto. The daughters can accumulate in the lungs and due to alpha emissions from their decay increase the risk of lung cancer. This effect or radon is well documented and certain sites around the country and around the world have been tested and found to have a high incidence or radon in residential areas, especially in basements.

Radon detection may be useful for assessing the risk of lung cancer in a given dwelling, or for assessing whether a particular building site may be appropriate for a dwelling. Inasmuch as a chain of radioactive decay prior to radon includes uranium-238, radon detection can be used in mining to detect concentrations of uranium. Radon detection has also been proposed in connection with predicting eqrthquakes as a means for detecting underground disturbances by their release or radon.

Various radon detection apparatus are known in the art. A usual method for radon detection includes capturing a sample, for example by filtering air at a test site through a charcoal filter, for transport to a laboratory. Laboratory equipment for analysis of samples by gamma spectroscopy is used to determine radon concentration at the test site, with due regard to the method sampling, the timing of the sample, etc. This technique, known as "grab sampling", makes the use of expensive laboratory equipment feasible because only one such unit need be provided for analysis of samples transported from various locations. Grab sampling has its drawbacks, particularly because the concentration of radon in the air may vary substantially over time and a given sample may not be representative. Furthermore, a grab sample is necessarily limited in volume and accordingly is statisticallyless significant than a long term sample of ambient conditions at the test location.

Laboratory quality radon detecting equipment can rely upon a careful analysis of the occurrence and power level of detected alpha particles. This technique, known as alpha spectroscopy, can involve use of a surface barrier semiconductor diode with an active surface sufficiently thin that alpha particles impinging on the surface will pass the surface barrier and give up their energy in the depletion region of the diode. The barrier is typically very thin such that alpha particles emitted by decay of radon at a space from the diode have enough remaining energy after passing through intervening air to be detected, just below the surface barrier. The depletion layer is also typically thick enough that alpha particles which are emitted very close to the surface of the sensor will not "punch" through the depletion layer and escape accurate energy measurement by depositing part of their energy outside the depletion layer. Accordingly, alpha spectroscopy devices normally employ a precisely manufactured surface barrier diode with a large surface area, biased to increase the thickness of the depletion layer. Carefully manufactured diffusion junction diodes have also bee n used. This equipment, together with means for analyzing the energy distribution of the signal received, is useful for quantizing radon in a sample, but is too expensive to be justified for permanent installation in the basement of a residence or the like.

In addition to counts of alpha particles resulting from decay of radon, other forms of ionizing radiation and other effects can produce sensor output variations or "background" counts that could be erroneously interpreted as having been caused by radon decay. Difficulties with electrical disturbances and the like causing transient signals erroneously interpreted as alpha particle counts, is a problem in radon detectors. In order to avoid erroneous detections, it has been necessary according to the prior art to rely upon expensive photodiode detectors and signal processing, the detectors being characterized by minimum background noise, low capacitance and minimal variation in detector characteristics. Even with these precautions, the background pulse count in typical detectors is relatively high such that the detectors must be operated for an extraordinary length of time compared to other types of detectors in order to develop statistically significant data. At the Environmental Protection Agency (EPA) threshold hazard level of four pico Curies/liter (4pCi/l), an expected counting rate of alpha particles as received in a typical semiconductor detector element is verylow, for example 1.8 counts per hour. At this rate, if complications due to substantial background noise and the like could be eliminated, statistically significant data can be developed, for example, by experience of 130 counts in three days. However, various transient conditions such as operation of motors near typical detection equipment, lighting storms and the like, may produce a count as high or higher than that due to alpha decay of radon.

Typical prior art detectors attempt to maximize the number of alpha particles which are detected, as a means for improving the ratio of alpha counts to noise. Alpha particles emitted by radon and radon daughters have an energy of 5–10 MeV (depending upon the particular isotope which decays), and accordingly travel only about 4 cm in air. Therefore, in order to maximize the detection according to prior art methods, one must set a very low minimum detectable pulse level, and be able to discriminate between noise and alpha particles having a range of energies from near zero to a predetermined peak energy. The peak energy is that resulting from alpha particle emissions due to decay of radon or radon daughters at the surface of the detector. Possible confusion as to the source of ionizationand the source of voltage and current variations in a semiconductor detector substantially complicate problems of testing for radon. This is true even if the radon concentration at the detector is sufficiently high to be considered extremely hazardous under EPA rules.

A laboratory analysis apparatus for processing grab samples is disclosed, for example, in U.S. Pat. No. 3,805,070-Auxier et al. This device has a test chamber with helium at atmospheric pressure for compression. Nevertheless, radiation within the test volume caused by alpha decay at a space from the detector will necessarily produce a weaker signal than a decay nearby the detector, and efforts to maximize statistical significance by detecting the weakest pulses cause difficulty with noise, thereby increasing background count levels.

In grab sampling, the time of collection can be crucial because the half life of radon and radon daughters in their various isotopes, ranges widely. Naturally occurring radon occurs as Rn-222, having a half life of 3.8 days (in the U-238 decay chain) and, to some extent, Rn-220 (in the Tn-232 decay chain). Due to the physical nature of emission of alpha particles from the nuclei of atoms, the energy emitted during a given isotope's alpha decay does not vary. However, in detection of the pulses, variations in spacing from the emission to the detector do cause variations because more or ess of the energy is absorbed in the air and other material between variations because the site of the radioactive decay and the depletion layer of a surface barrier diode or the like in which the pulses are to be detected.

A variety of devices have been designed in which semiconductor diodes, phototransistors or the like are employed to develop a signal utlimately caused by some form of ionizing radiation, which signal is amplified, the pulses in the signal are counted, and the count is compared to a maximum. These devices are sometimes called dosimeters, being intended to measure the total dose of radiation applied to an individual, the devices integrating indefinitely, possibly activating an alarm or indicator when a predetermined level is reached. Examples of such devices are disclosed in U.S. Pat. Nos. 4,489,315-Falk et al; 4,484,076-Thomson; and 4,301,367-Hsu. A disclosure of a particular photodiode cell for use in a dosimeter isfound in U.S. Pat. No. 4,469,945-Hoeberchts et al. A sensor employing a bank of photodiodes is disclosed in U.S. Pat. No. 3,564,245-Koehler.

A number of the foregoing detectors and dosimeters are intended for use in cases of high levels of incident radiation, for example in connection with x-ray machines and the like, where the incidence of impinging radiation is substantially greater than with radon. Attempts to use similar devices for detection of very low pulse rate radiation have not been as successful.

In connection with known photodiode-type detectors, attempts have been made to discriminate between detected particles based upon their energy levels. U.S. Pat. No. 4,104,523-Wolfert, for example, teaches a subterranean detector in which a pulse height discriminator (i.e., an analog voltage comparator) discriminates against pulses of a lower energy level than a preset comparator threshold. It will be appreciated that the variation in deposited energy from maximum to zero caused by the fact that radioactive decay producing a signal may occur from 0 to 4 centimeters from the detector, means that the input to the voltage comparator will likewise vary from 0 to a maximum voltage. Therefore any threshold betwen these levels (i.e., any threshold above zero) will eliminate counting of some alpha particles impinging on the detector. The device can nevertheless be set up such that the counts received above an arbitrary threshold energy level (just above the normal noise level) are counted, and the count can be statistically related to radon concentrations, namely by determining typical background count for each unit and measuring the count at a known concentration of radon. The accuracy of such a detector relies very heavily on the exact placement of the threshold, must be recalibrated frequently to account for drift in threshold and/or background, amplifier offset and the like, and is entirely unsuited to a very low cost long term measurement application as is typical of smoke detectors for residences.

Portable radon detectors have been attempted. One form of portable detector includes a sample of clear plastic or the like to be placed in a test area, a visually inspected for visible damage in the form of holes or tracks produced byimpinging alpha particles. Portable detectors of one kind or another are disclosed in U.S. Pat. Nos. 4,607,165-Berghoffer et al; 4,518,860-Alter et al; and 4,352,014-Powell. While these devices show various means for compact or portable packaging for detectors of various types,none shows a successful attempt to use a semiconductor sensor for radon detection in a manner that uses inexpensive parts and need not be frequently calibrated.

The present invention avoids dependence on close discrimination of energy levels, and therefore avoids any necessity to discriminate closely between the alpha particles emitted near the surface of a detector or far from the surface. A substantially improved signal to noise ratio is provided by making certain improvements in a detector and by discrimination and processing count data with certain assumptions in mind. By removing problems with noise and background counts, the device results in a very accurate detector over the long term. The effects of local electrical disturbances are cancelled. Rather than detecting radon or even attempting to distinguish between slightly higher energy pulses from close alpha emissions and slightly lower energy pulses from relatively more distant alpha emissions, the invention is responsive to decay of plated-on radon daughters only. Preferably, means are provided to force radon daughters in the near vicinity of the sensor to plate directly on the sensor element, where the threshold detected energy level can be set just below the maximum energy of alpha emission, i.e., occurring at zero spacing from the detector. By assuming that Radon-222 (i.e., in the decay chain of Uranium-238) is the only radioactive emitter likely to be found in a typical residential basement, and with due regard to the identity and characteristics of the daughters of Rn-222, one can set the threshold very accurately in this manner. The relatively high threshold voltage reduces the number of background counts and improves statistical accuracy.

By avoiding dependence on close discrimination of local and distant alpha particle emissions, instead relying upon very dependable emissions from alpha decay of radon daughters directly on the surface of the detector, and by other noise reduction techniques as set forth herein, it is possible to decrease the expected number of background counts to such an extent that quite accurate results are achieved with even the most inexpensive of sensor elements, for example photovoltaic cells currently costing a few dollars or less, typically used for solar power collection. Such detectors are suitable for low cost residential use, in a permanently-mounted detector to be installed in a residential basement of the like. The device preferably is operated similar to a residential smoke alarm, having a visible output and, optionally, a means for remote signaling. The device can also be used to control operation of equipment intended to alleviate concentrations of radon, for example ventilation equipment. The ventilation equipment can conveniently be operated in time proportion with the extent of risk detected.

SUMMARY OF THE INVENTION

It is an object of the invention to provide an effective radon detector that is very low in cost and uses high energy level pulses from captured radon daughters together with noise reduction and background count reduction techniques to improve the reliability of risk assessment.

It is also an object of the invention to allow a statistically dependable assessment of risk in as short a time as possible by minimizing the effects or certain difficult-to-measure alpha decay instances, short term noise and long term component drift.

It is a further object of the invention to produce a radon detector that is operable to display a risk assessment on the short term and at the same time to accumulate and display a long term integrated risk assessment.

It is still another object of the invention to permit widespread use of dependable radon monitoring in residential dwellings, including the option of using the detector as a control means for equipment operable to mitigate circumstances resulting in high radon concentrations.

These and other objects are accomplished by a low-cost radon detector using a solid state diode having a depletionlayer disposed close enough to a test medium that alpha particles deposit their energy in the depletion layer. The signal produced by this diode is amplified and compared to a voltage threshold typical of pulse levels produced by radioactive decay of radon daughters very close to the surface of the sensor, thereby excluding variable energy alpha signals from radon or other alpha sources disposed at a distance from the sensor. A second amplifier and threshold detector paralleling and simulating operation of the first amplifier and threshold detector but not having means for alpha detection in a semiconductor detector, produced pulses during instances of transient disturbances. Logic means are provided to compare and determine whether only the first amplifier experiences a pulse (indicating an alpha decay), or that both the first amplifier and the second or "dummy" amplifier emit a pulse (indicating noise). A conductive enclosure around the sensor element can be biased relative to the sensor to force radon daughter ions to plate out on the sensor, and pulses thereafter produced by decay of these plated-on radon daughters fall closely into certain pulse height ranges well above the noise threshold. Pulses detected in the selected ranges are counted and the counts are compared to a calibrated threshold risk level, adjusted by a background level that can be increased over time to account for electroplating of longer-lived radon daughter isotopes, the adjusted counts being used to determine whether risk conditions exist in the short and/or long term.

BRIEF DESCRIPTION OF THE DRAWINGS

There is shown in the drawings the embodiments that are presently preferred. It should be understood that the invention is not limtied to the precise arrangements and instrumentalities shown in the drawings, and that the invention is subject to variations and groupings of the respective parts. In the drawings.

FIG. 3 is a schematic diagram of a preferred power supply circuit.

FIG. 4 is a schematic diagram of a power-up reset and power status check circuit.

FIG. 5 is a perspective view of the invention embodied in a physical package.

FIG. 6 is a perspective exploded view of an alternative physical embodiment of the invention, for use in a wall-mounted junction box arrangement.

DETAILED DESCRIPTION OF THE PREFERRED EMBODIMENTS

Figure 1:
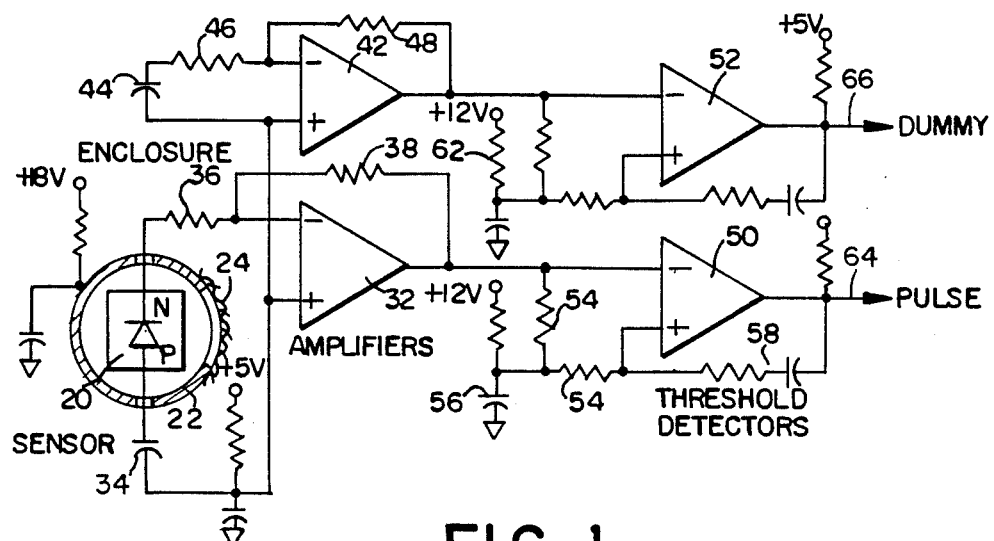
FIG. 1 is a schematic diagram of the sensor, amplifier and threshold detector section according to the invention.

The input stages of the device according to the invention are illustrated in FIG. 1. Energy deposited by an impinging alpha particle produced by the radioactive decay of radon and radon daughters produces free charge carriers in the depletion region between the n and p regions of sensor 20. Sensor 20 is preferably a solid state photodiode having a depletion layer disposed close enough to the test medium within enclosure 22 that alpha particles impinging on sensor 20 deposit their energy in the depletion region. Sensor 20 need not have an ultra-thin surface barrier and need not be of extremely large area (although these are useful qualities) due to the fact that the device preferably relies upon detected alpha emissions of radon daughters on the surface of sensor 20.

Preferably, air being sampled enters the enclosure 22 by diffusion through filter 24. Filter 24 stops the passage of any dust particles, to which radon daughters may already have become affixed. Accordingly, only radon gas together with the ambient air passes through filter 24 into the area of sensor 20. By virtue of connection of sensor 20 in the circuit as shown, the sensor 20 remains at about 5 volts DC. Enclosure 22 is preferably biased more positively than sensor 20, by means of connection to a higher voltage supply, for example 18 volts DC from the unregulated DC power input. Preferably, enclosure 22 is connected to the voltage source through a resistor, and is capacitively coupled to ground, the thereby de-couple the enclosure from higher frequency voltage variations on the DC supply line.

One amplifier and threshold detector produce an amplified and pulse height discriminated output on the "pulse" line. A corresponding amplifier and threshold detector are included, without a sensor element, leading to the "dummy" output. Both produce pulses in the event of noise; only the "pulse" line produces a signal due to alpha detection.

Operational amplifier 32 is connected as shown as a feedback amplifier, with a fixed gain. Sensor 20 is connected across the inverting and non-inverting inputs, the non-inverting input being connected to the 5 volt supply through a resistor and to ground through a capacitor. An additional capacitor 34 is connected in series with sensor 20. Operational amplifier 32 can be expected to have at least a minor offset voltage between its inverting and non-inverting inputs. This input offset biasing tends to charge capacitor 34, which therefore balances the offset and tends to preclude any voltage bias across sensor 20 and eliminates the need for an offset mulling potentiometer to zero out the amplification of offset voltage. The capacitor also eliminates the need to adjust for changes in offset over time, or from unit to unit.

Sensor 20 should have a sufficiently thin diffusion layer surface barrier and sufficiently thick depletion layer to accumulate alpha particles impinging over the range of expected energy levels. However, the range according to the invention is minimized. The sensor 20 can be an inexpensive photovoltaic cell, and will operate quite adequately in the subject circuit. One or more cells can be used to define the sensor. The circuit does not bias sensor 20 in order to increase the thickness of the depletion layer, but on the contrary includes capacitor 34 to avoid a bias on sensor 20. A preferred photovoltaic cell is model 21S650, amnufactured specifically for Sun Nuclear Corporation, according to a modification of the standard "VTS" process sold by EG and G Vactec, of St. Louis, Mo. The device is similar to a standard low cost photovoltaic cell, but is terminated with nickel rather than solder to avoid proximity to alpha emitting lead.

The expected impingement of alpha particles die to radon decay at a radon concentration causing 4 pCi/l of alpha radiation will result in a very low frequencyof counts, for example a count rate of less than 2 counts per hour. AT this low count rate, it is most important to have a repeatably operating system that is insensitive to noise. The particular energy deposited by alpha particles according to the device of the invention, for example an energy on the order of 5–10 MeV (depending on the isotope decaying), is amplified by operational amplifier 32 to produce a pulse output of 200–500 millivolts (mV). The particular gain of amplifier 32 is determined by the ratio of feedback resistor 38 to the series resistance between the inverting and non-inverting inputs, namely including the series resistor 36 and the resistance of sensor 20. The particular pulse heights experienced are subject to a certain distribution, due to the variation in the energy level of impinging alpha particles. THe variation may result from whether alpha particles were generated by decay of radon or certain radon daughters, and also due to the possible variation in distance from sensor 20 at which the alpha particles were emitted, part of the energy of the alpha being absorbed in intervening air.

Alpha particles are emitted at very dependable energy levels which are known for each isotope. However, the distance from the sensor does cause variation in sensed energy level. Alphas from decaying Rn-222 are at 5.5 MeV; alphas from radon daughters are at 5.3 MeV for Po-210, 6 MeV for Po-218, and 7.7 MeV for Po-214. According to the invention, the pulses output from amplifier 32 can be discriminated closely based upon their pulse height, and the threshold for pulses to be counted can be set at a relatively high pulse level, according to the invention. Enclosure 22 is preferably positively biased with respect to sensor 20. Therefore, positively charged ions within enclosure 22, will be impelled towards sensor 20. These ions include radon daughter ions tha, unlike radon which is a noble gas, occur as positively charged metal ions that become plated on any available surfaces taht can supply free electrons. Enclosure 22 is such a surface, but enclosure 22 has a conductive surface which is preferably biased positively with respect to the sensor, such tat plating of radon daughters tends to occur directly on sensor 20. On an equilibrium situation, one, can mathematically show that the concentration of radon daughters is directly proportional to the concentration of radon in the enclosure, particularly because filter 24 blocks dust particles that could carry ambient daughters into enclosures. THe threshold voltage level of pulses from amplifier 32 which are passed and counted, can be set closely to detect exclusively one or more of the daughters. Inasmuch as the daughters decay and emit alphas after being plated on sensor 20, the energy level from such decay is very precisely predictable. The particular pulse levels output by amplifier 32 will be discussed more fully hereinafter, with reference to FIGS. 8 and 9. It is sufficient to say at this point that pulses high enough to exceed a threshold defined in part by a resistor network will cause pulses to be output from threshold detector 50, the output of which is wired to a pulse counting means.

Threshold detectors 50 and 52 are high gain amplifiers, known as comparators, four of which are commonly available in one fourteen pin integrated circuit (IC). The other two comparators in this IC are used as shown in FIG. 4. The comparator 50 has a pair of resistors 54 connected between its inverting and non-inverting inputs. The junction between resistors 54 is connected to an integrating capacitor 56, such that the threshold level, namely the voltage at the noninverting input to threshold detector comparator 50, is determined in part by the average output of amplifier 32, which accumulates in capacitor 56. Accordingly, any DC bias on the output of amplifier 32 will be reflected in the threshold due to averaging capacitor 56, whereby the threshold detector 50 becomes responsive to variations in output of amplifier 32, and not only to the voltage on the output of amplifier 32 crossing of a predetermined DC level on the noninverting input.

The output of the comparator defining threshold detector 50 is preferably connected by means of a series-connected capacitor and resistor 58 to the noninverting input. A high-going pulse on the input to threshold detector 50 results in a low-going pulse output. Accordingly, when an output pulse occurs on threshold detector 50, the voltage at the noninverting input (i.e., the threshold voltage) is temporarily lowered for a time defined by the values of the resistor and capacitor connected in series along feedback line 58. Inasmuch as the threshold is temporarily lowered, the pulse output by threshold detector 50 is stretched, causing the threshold detector to have a one shot output.

As noted hereinabove, the expected count rate of alpha particle decay is rather low. Although the expected count rate of course varies with the concentration of radon, at the EPA hazard threshold of 4 Pico Curies/liter (4 pCi/l), the expected count rate may be less than 2 counts per hour. Therefore, even occasional occurrence of electromagnetic disturbance can produce a significant background level detracting from the statistical significance of the counts received. In order to avoid erroneous counts due to transients, a second amplifier 42 and threshold detector 52 are provided, to produce the "dummy" pulse output. Amplifier 42 preferably has at least one connection in common with amplifier 32 such that transients on the power liens will produce pulses in both. Transient interference in the air, for example due to starting and stopping of motors or other inductive loads, lightniung or other interference, will produce pulses on both amplifiers 32 and 42. Pulses due to alpha decay impinging on sensor 20 will produce a pulse only on amplifier 32. Amplifier 42 is provided with a series resistor 46 and feedback resistor 48 of comparable values to those of amplifier 32. A capacitor 44 is likewise provided to accumulate any offset between the inverting and noninverting inputs of amplifier 42. Therefore, amplifier 42 can be expected to produce pulses of a comparable level to amplifier 32. Similarly, threshold detector 52 is provided with a resistor ladder and averaging capacitor similar to the connections of resistors 54 and capacitor 56 for threshold detector 50. It is presently preferred that the pull-up resistor 62 for the dummy threshold detector 52 be somewhat larger than the similar resistor used for threshold detector 50, thereby making the dummy pulse threshold level somewhat lower than the alpha pulse threshold level. Accordingly, dummy pulses may at times occur from threshold detector 52 without alpha pulses occurring on threshold detector 50. Should any electromagnetic pulse sufficient to trigger threshold detector 50 occur through amnplifier 32, then the lower threshold ensures that a similar pulse will be detected at threshold detector 52, producing a dummy output. The threshold for detector 52 can for example be half that for detector 50.

Figure 2:
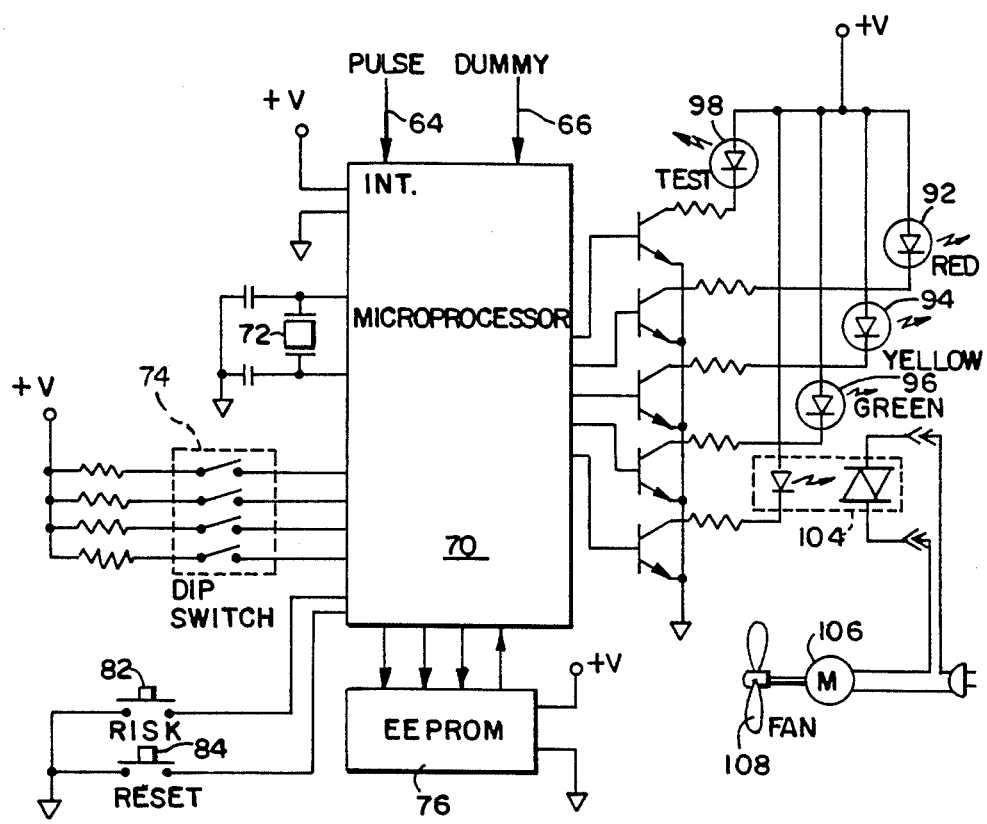
FIG. 2 is a schematic diagram of the pulse counting and control means, as embodied using a microprocessor.

Means are provided according to the invention for counting pulses on the output of threshold detector 50, unless pulses are also found at the same time on the output of dummy threshold detector 52. These outputs of the threshold detectors 50, 52 can be gated together and used to increment counters. Preferably however the pulses are connected to inputs of a microprocessor 70, shown in FIG. 2. Microprocessor 70 can be any of various microprocessors available on the market. The microprocessor includes a central processor with arithmetic and logical functions, and includes a program preferably stored in read only memory. Preferably, the pulse output from threshold detector 50 is connected as an interrupt input to microprocessor 70, which otherwise is programmed to repetitively monitor switch inputs and to keep track of time. The microprocessor during the interrupt service routine monitors the output of dummy threshold detector 52, connected to a digital input of microprocessor 70, for a predetermined time after the occurrence of the interrupt. Should the dummy output also show a pulse during the prescribed time (e.g., 100 msec to 10 sec, preferably 1 sec), then the alpha channel pulse is ignored. Otherwise, the alpha channel pulse is counted and assumed to result from the occurrence of an impinging alpha particle on sensor 20. Microprocessor 70 is provided with a time base crystal 72, determining its processor cycling rate and also forming a time base by which micorprocessor 70 can monitor the passage of time. Processor 70 counts the number of alpha particle pulses occurring per known unit of time, and compares the results of this counte to a number empirically determined to represent a predetermined concentration of radon. This predetermined concentration could be, for example, the EPA limit of 4 pCi/l. Other predetermined concentrations can also be selected. The currently preferred radon monitor according to the invention is adapted by means of dip switches 74 to select concentrations of 4, 20, or 80 pCi/l at the user's option. The memory of microprocessor 70 includes constants for the expected alpha count and time interval length for each of the possible concentrations.

The length of time during which the processor is operable before statistically significant count data is achieved, varies with the number of counts. The larger the number of counts, the shorter the interval of time during which statistically significant data (e.g. accuracy to within 30 percent of the stated threshold, at 90 percent confidence level) can be reached.

The microprocessor 70 preferably is arranged to allow the user to reset the current counting interval, starting again with time and pulse count accumulations. The processor is also adapted to allow the user to determine the results of long term risk experience. The risk and reset push buttons 82, 84, respectively, and the outputs of dip switch 74 and dummy pulse input 66 are each digital inputs (i.e., level inputs) periodically scanned by microprocessor 70, while pulse input 64 is preferably connected as an interrupt. It is also possible to simply run microprocessor 70 in a loop, monitoring pulse 64 as a digital input as well.

Whether the user selectes display of the last interval risk status or the long term risk status, processor 70 has digital outputs connected to drive LEDs indicative of the different possible results. Preferably, a yellow LED 94 is flashed upon every occurrence of an alpha pulse, reassuring the user of correct operation. Red LED 92 is activated to indicate either that the last interval exceeded the preset radon concentration threshold count, or that the long term risk (if selected by push button 82) indicates a risk situation. conversely, green LED 96 is let when the last interval or the long term risk were below the preset threshold count.

And additional LED 98 is preferably provided as a means for testing operation of the entire radon detection system. LED 98 can be mounted inside enclosure 22, adjacent sensor 20, and arranged to produce a pulse exceeding the pulse threshold level. Microprocessor 70 periodically flashes test LED 98, and monitors pulse line 64 for the expected pulse output. If the expected output is not received, the microprocessor 70 indicates an error condition, perhaps by lighting all three LEDs. In each case, the LEDs 92, 94, 96, 98 are connected in series with a resistor to the collector of their respective driving transistors.

Risk is assessed both on the short term and the long term. Short term risk assessment involves counting a statistically-significant number of counts and a corresponding time interval during which radon concentration at the nominal level would produce that number of counts. Concentration is over nominal if the count is reached sooner, or under nominal if the interval expires first.

Long term risk assessment requires that data representing the number of alpha counts detected and the length of time cf detection be stored over the long term. Preferably, the device according to the invention is powered by means of an external DC supply, derived ultimately from the domestic alternating current mains in a residence or the like in which the apparatus is installed. The device can also be operated from batteries, possibly rechargeable batteries that are used only on AC power failure. In either event, whether operated from AC or from batteries, power outages can be expected, particularly over the very long time periods that on-site radon monitors are expected to operate. Long term risk conditions may require monitoring of alpha count experience for many months or years. Microprocessor 70 stores long term data in an electrically erasable programmable read only memory (EEPROM) 76. This long term, non-volatile memory keeps track of the long term risk by accumulating information respecting the number of alpha pulses counted, and the number of defined-increments of time passed during which one alpha count would have been expected if radon concentration was at the selected risk threshold (e.g., 4 pCi/l). The length of time for one expected count, or the defined "long term risk interval" is programmed into microprocessor 70, having been determined by experimentation to represent the count rate experienced by the circuitry of this sensitivity when exposed to radon of the given concentration. The precise interval may also be determined in calibration procedures for each unit. The long term risk interval (i.e., the exptecte time lapse per alpha count at nominal concentration) is different (i.e., much shorter) than the interval of statistical significance used for short term risk assessment.

The device of the invention is preferably arranged to control various forms of equipment adapted to mitigate radon hazards. Such equipment may include a fan 108, driven by motor 106, and controllably connected to the AC supply by means of an optically-coupled triac 104 activated when necessary by microprocessor 70. The user is also permitted to select various forms of operation for the fan, based upon detection of risk conditions. For example, should the user so determine, a digital input (e.g., from dip switch 72) can be selected for operation of the fan following detection of a risk interval for 25 percent, 50 percent or 100 percent of the time. It is also possible to program microprocessor 70 to make this proportional decision automatically, based upon the extent of detected risk. For example, should the detected alpha count far exceed the threshold level, processor 70 can operate fan 108 100 percent of the time, or should the threshold count be only slightly exceeded, processor 70 could operate fan 108 occasionally during the interval.

Power supply to the overall circuitry is illustrated in FIGS. 3 and 4. According to FIG. 3, an 18 volt supply is provided externally along line 110, and is regulated by means of regulators 112, 114 down to 5 volts and 12 volts, respectively. A surge suppressor 116 is provided to at least partly block incoming interference along the power lines. Diode 118 protects the circuits against being connected backward across the power supply. A plurality of storage and decoupling capacitors are provided along the way. According to the invention as illustrated in FIG. 4, additional threshold detectors are provided between the 18 volt supply, the 5 volt supply and ground. A power up reset circuit holds microprocessor 70 in reset condition until storage capacitors have charged to the point where the 5 volt supply reaches or approaches its expected proportion of the 18 volt supply as determined by a resistor ladder. The 5 volt supply is also compared to a different point on the resistor ladder to provide a "power status" output, that can also be used through microprocessor 70 to prevent starting to write into EEPROM 76 if the DC voltage is inadequate to complete the write cycle dependably.

Figure 7:
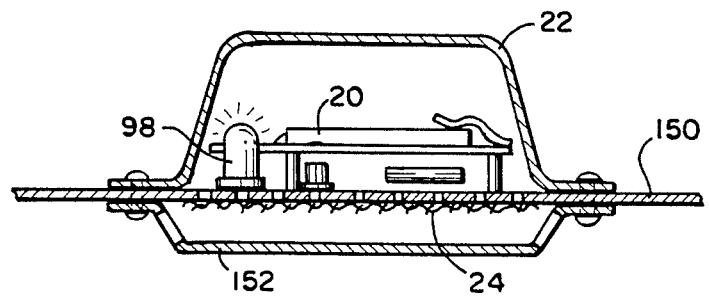
FIG. 7 is a partial section view illustrating mounting of the sensor element in an enclosure.

Physical embodiments of the radon detector according to the invention are shown in FIGS. 5–7. FIGS. 5 and 6 illustrate external packaging features according to optional preferred embodiments. In FIG. 5, a canister-like housing 130 having upper and lower louvers 132, permitting ambient gas to diffuse into the area defined by canister 130 are provided. Push buttons 82, 84 and indicator LEDs 92, 94, 96 are provided on the external surface. These components can be edge mounted on a circuit card and the card can be mounted vertically in canister 130. Preferably, light blocking filters are placed inside the louvers.

In another preferred embodiment as shown in FIG. 6, the radon detector is provided to be permanently flush mounted on the wall of a building, for example mounted by means of nails 144, affixing a junction box 146 housing the circuitry, directly to a stud in the building. The indicator LEDs and push buttons are provided on the surface and air circulation holes 142 allow ambient air to diffuse into the area of the detector.

Preferably, the sensor 20 is mounted in enclosure 22 as shown in FIG. 7. A circuit card 150 is provided with a plurality of holes through which ambient air can diffuse. A lower cover plate 152, having holes along either edge, allows air to diffuse through filter 24, which covers the holes in circuit card 150. Sensor 20 is mounted at a space from the other components mounted on circuit card 150, and by mounting sensor 20 on a raised flat table as shown, the surface area of sensor 20 is made large with respect to the surface area of enclosure 22. Accordingly, less surface area per unit of volume, compared to the surface the components on the circuit card, is available for plate-out of radon daughters apart from the surface of sensor 20. This also locates sensor 20 at a distance from any alpha emitters in the circuit components that would otherwise contribute to background counts (i.e., counts expected in the absence of radon). Enclosure 22 is preferably made froma conductive plastic, being connected to the positive supply through circuit card 150. Similarly, connections to sensor 20 are made through card 150 and conductors that function as stand offs, holding sensor 20 on the table spaced above circuit card 150. Preferably, sensor 20 is entirely free of lead solder, being connected by means of conductive epoxy, and having nickel terminations rather than solder terminations.

Figure 8:
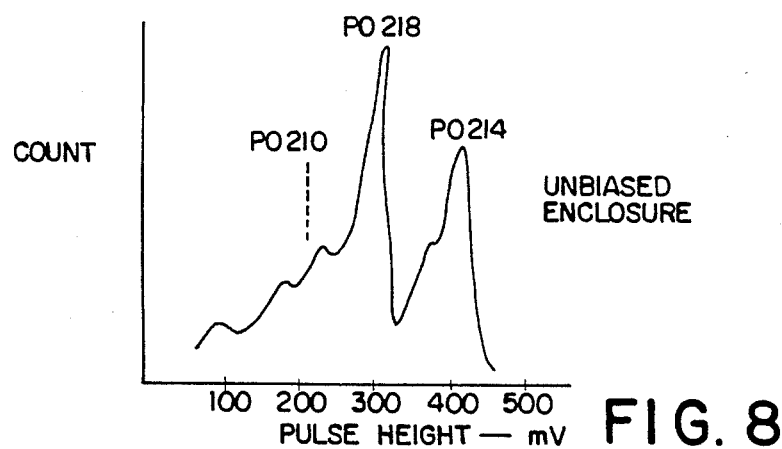
FIG. 8 is a histogram illustrating the distribution of pulse heights produced by the amplifier circuit of FIG. 1, except without the biasing of the enclosure relative to the sensor.
Figure 9:
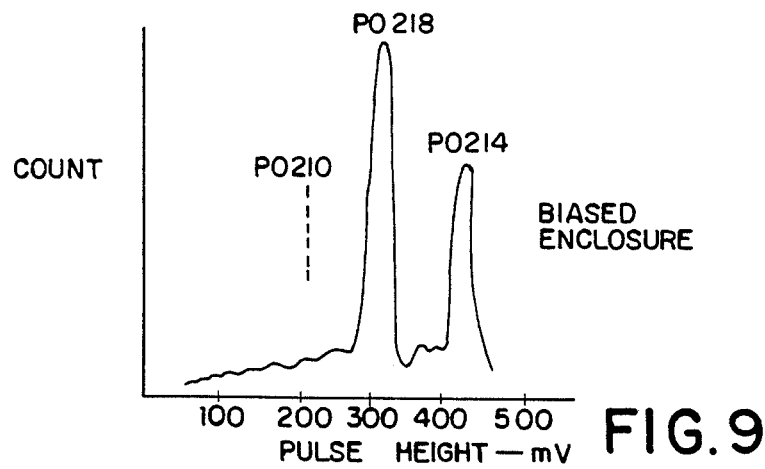
FIG. 9 is a histogram corresponding to FIG. 8, with the enclosure biased relative to the sensor.

FIGS. 8 and 9, which are histograms showing the number of occurrences of pulses at a range of pulse heights, were developed by means of a circuit similar to that shown in FIG. 1. An analysis of these results, together with consideration of the half lives of radon and the radon daughters, polonium 210, 214 and 218, provide a means by which the threshold pulse height to be passed through threshold detector 50 can be set quite high, thereby further decreasing the effects of noise, and reducing the expected background count. The reduction of background and noise provide statistically significant results in a shorter time. Moreover, by not relying upon alpha particles emitted by radon and instead by closely setting one or more threshold levels to discriminate only for alpha particles emitted by radon daughters, extremely accurate results are possible, nearly eliminating certain sources of background counts, by the device according to the invention.

Radon occurring in residences is virtually always Pn-222, in the U-238 decay chain. In other words, othe forms of alpha emitting sources, such as American or Thorium are unlikely to be found in a typical residence. With this assumption in mind, it is possible to resolve radon concentrations to within 0.1 to 1 pCi/l, and confidently to measure a concentration of 4 pCi/l within several days (three to thirty days). The detector of the invention has been found to resolve 0.1 pCi/l and to measure 4 pCi/l in about three days. Noise reduction techniques are part of the reason for this accuracy. These noise reduction techniques include the use of the dummy amplifier circuit 42, mimicking the connection of amplifier 32 except for the use of sensor 20. During the manufacture of sensor 20, all processes that being the device into or near contact with substances that contain alpha emitting radiation have been reduced or eliminated. In particular, solder is not used because solder contains lead and lead has naturally occurring isotopes which are alpha emitters (lead is the eventual result of U-238 and/or radon decay). If alpha emitting isotopes are deposited on the device during manufacture, then when radioactive decayoccurs in the isotopes, it is not possible to distinguish the result from radon decay.

Noise and background reduction are also provided by discriminating pulses due to a careful analysis of the pulse heights experience. There are two main peaks in the histograms of FIGS. 8 and 9, representing a radon gas spectrum due to decay of radon daughters Po-218 and Po-214. The peaks are due to the plate out of these radon daughter ions onto the detector. A significant portion of the background spectrum, including the expected pulse level alpha particles from decay of radon-222, lies over a range below these two peaks. Therefore, the threshold detector setting can be set just below the two peaks, which will then ignore the background pulses. This will prevent detection of long-lived Po-210, normally forming an increasing proportion of background counts over time, and eliminates the need to discriminate directly for radon-222 alpha decays, ranging from zero (for Rn-222 decay at a distance) to a point below that of Po-210 (for Rn-222 decay adjacent sensor 20). The discriminator setting for the noise detection dummy amplifier is set well above the normal operational amplifier noise, but about half the setting of the alpha detector circuit.

In addition to the foregoing noise reduction features, DC offsets for the op amps are eliminated where possible, by means of capacitors 34, 44, and by providing threshold detectors having a voltage dependent upon the average output of the amplifiers 32, 42. Capacitor 34 across the inputs of amplifier 32, for example, supports the steady state offset voltage but does not change the voltage significantly during an alpha particle current transition.

Plate out of radon daughter ions occurs on any available surface. According to the invention, the enclosure 22 is biased more positively than the detector 20, to thereby encourage the radon daughters to plate out onto the detector 20 rather than on any surfaces which may be more remote from sensor 20. Inasmuch as the alpha particles emitted during radioactive decay will lose part of their energy passing through air, more distant decays are minimized in this manner and very pronounced peaks as shown in FIG. 9, occurring due to radioactive decay in Po-218 and Po-214 plated direclty on the surface of sensor 20, form the basis of measurement. According to the time periods of interest, plate out of radon daughters on/the sensor does not produce an undue background as do solder and other lead-containing material in the area of the detector. The half life of Po-218 is only about 3 minutes and the half life of Po-214 is a fraction of a second, however, the growth half-life of Po-214 is on the order of an hour or so.

Po-218 alpha decay occurs at about 6 MeV; Po-214 decay at about 7.7 MeV; and Po-210 at 5.3 MeV. Rn-222 decay occurs at about 5.5 MeV, but maximum energy deposition cannot be relied upon to provide a peak spectrum because the location of Rn-222 decay is variable. In FIGS. 8 and 9, Rn-222 decay contributes to the sloping graph contour from zero to about 300 mV.

Detecton efficiency of plate out on the detector is about 50%. Detection efficiency of radon gas is only about 0.5% at low thresholds (where noise is highest) and decreases as the threshold is increased. Furthermore, each radon decay is followed by two daughter decays within a short time. Inasmuch as the daughters to some extent can be captured by biasing the enclosure dome, detection efficiency increases greatly. This is seen in comparing FIGS. 8 and 9, where FIG. 9 has a less pronounced slope from zero to 300 mV representing decay of Rn-222 and its daughters at a range of locations spaced from sensor 20. All these techniques have resulted in achieving a background rate of 20 percent or less of the count rate, as compared to previous results prior to these improvements when a more typical background rate was five times the count rate.

The isotopes other than Po-210 do not produce a long term background count. Po-210, however, has an effective 20 year half life. It is possible to arrange the device according to the invention such that the threshold count level expected at nominal or risk conditions (i.e., alpha count plus background count) is increased over time to account for the increased background count caused by accumulation of Po-210 plate out on the sensor element. Alternatively, it is possible to set the threshold pulse height of threshold detector 50 at just below the peak for Po-218, thereby discriminating against Po-210 by virtue of its energy level.

Another possibility is to employ a dual threshold detector to discriminate for only pulses resulting from alpha decay of only Po-210. This arrangement results in a radon "sniffer" having a very short response time. Such a device is operable for high radon concentrations. Nevertheless, statisticallysignificant results at lower concentrations require long term monitoring.

The production of Po-214, Po-210 and Po-218 isotopes from decay of radon can be mathematically related to the concentration of radon, assuming that the gas present is Rn-222, having a half life of approximately 3.8 days. Accordingly, detection of alpha emissions from certain isotopes, to the exclusion of alpha emissions of Rn-222 itself, nevertheless accurately indicates the presence of radon in a typical residence.

A number of additional variations are appropriate according to the invention. The radon chamber can be heated slightly above ambient temperature in order to lower relative humidity in the detector. This improves the operating environment of thedetector, particularly during cycling through the dew point. This heating also helps to stabilize the plate out on the detector caused by a positive bias of the enclosure dome. The heating rate preferred according to the present design is one watt for a 0.1 liter chamber as preferred, and is accomplished by locating an appropriately sized resistor in the enclosure.

A preferred counting scheme employed with microprocessor 70 can simplify determinationof both single risk intervals and long term risks. Initial design and calibration of the detector allow the designer to define a certain expected average alpha count over a certain interval, which should occur (subject to variations due to probability) whenever the radon concentration is at a predetermined level, for example 4 pCi/l. After a statistically significant number of pulses are counted, the average is reliable to a known confidence level. According to the invention, both the expected time interval and the significant alpha count are counted down from this threshold number. If both "timeout" and "countout" occur simultaneously, then the radon concentration for a shor tterm measurement is at the threshold. If timeout occurs first, then the concentration is below threshold, and the green light is activated. If countout occurs before time out, then the concentration is above threshold and the red light is activated. The intervals shorten when theconcentration increases, which provides an earlier warning to the residence occupants.

Threshold pulse count and time count values are determined through a calibration procedure. This procedure empirically measures the background counting rate and the sensitivityof thedetector to radon gas. These two values are then used in combination with a required statistical accuracy to generate a total number of counts (including background) over a total period of time required if the concentration is at threshold value. The statistical accuracy refers to the uncertainty of the net counting rate due to the radon concentration alone.

According to the foregoing counting scheme, assuming a threshold level of 4 pCi/l, one might reach adequate confidence levels after approximately 130 counts over three days. If 130 counts are reached in less than three days, the red light is activated indicating that a risk interval (concentration over nominal) just occurred. If three days are reached before 130 counts are reached, then the green light is lit, indicating a safe interval just occurred (concentration under nominal). Long term risk assessment requires a slightly different arrangement, in which all counts and all time prior to display of "risk" conditions are accumulated. Assuming again that the threshold level of 4 pCi/l is found to provide 130 counts over three days, one can divide to determine that one count on the average should occur approximately every 2,000 seconds. 2,000 seconds is therefore defined as one "long term risk interval". Accordingly, for long term risk assessment, microprocessor 70 is programmed to keep count of all alpha counts sensed and all intervals of 2,000 seconds passed, from the beginning of operation of the detector to the present. If the number in the counts register exceeds the number in the intervals register, long term risk conditions indicate a risk, i.e., average concentration experienced to date is over the set threshold. If the number in the intervals register exceeds the number in the counts register, long term risk conditions are good, i.e., average concentration to date is under the threshold. It will be appreciated that this form of comparison between counts and intervals is in fact a ratio comparison, however, by defining the interval counted as the expected time during which one count will occur, this proportion requires only a simple comparison of the totals in the registers.

The long term risk counters, for example 16 bit binary counters, will eventually overflow. Rather than reset the long term risk counters or attempt a logarithmic sum, it is presently preferred that the contents of both long term risk count registers be simply shifted one bit toward the least significant bit when either is about to overflow, thereby dividing the counts by two. Counting then continues with the now-divided old counts having less significant individual contribution than the current counts occurring since the division. The counts are not dropped. Therefore a relevant comparison of the old pulse count and old interval count remains available not withstanding the division. Accordingly, long term risk is indicated and the results are meaningful indefinitely.

The short term intervals required in order to reach statistically significant data are, as noted above, dependent upon the concentration and incidence of alpha counts. According to current experiments, it is expected that a system according the present invention will accurately (for example 70 percent certain) reflect radon concentrations causing an alpha radiation exposure of 4 pCi/l within about 54 hours; 20 pCi/l within about 11 hours and 200 pCi/l within one hour.

Other particulars of operation of microprocessor 70 will be apparent from the following flow chart outline:

| Radon Monitor Flow Chart | |
| --- | --- |
| POWDER ON: | Initialization |
| | Display last interval status |
| | Start new sub-interval (12 h) |
| | Clear sub-interval RAM counters |
| | Sub-interval loop |
| | Enable PULSE interrupt |
| | Timer increment (4 min) |
| | If end of interval, the DISPLAY |
| | SAVE date to EEPROM every 12 hours |
| | Scan for RESET or RISK |
| | Loop |
| PULSE: | Alpha comparator interrupt |
| | If no accompanying noise pulse, then increment RAM alpha counter |
| | Return to Loop |
| SAVE: | Save the following to EEPROM |
| | Interval time count |
| | Interval alpha count |
| | Long term risk time count |
| | Current interval status |
| | Long term risk alpha count |
| | Return to Loop |
| DISPLAY: | If interval alpha count is greater than threshold alpha count then display red, else display green |
| | Write interval status to EEPROM if different from last |
| | Reset counters for start of new interval |
| | Return to Loop |

| | -continued |
|---|---|
| | Radon Monitor Flow Chart |
| RESET: | Flash dome LED, Blink yellow if OK |
| | Reset counters for start of new interval |
| | Turn lights out |
| | Return to Loop |
| RISK: | Compare total alpha count (AC) to total time count (TC) |
| | If AC is greater than or equal to TC then light red while risk is depressed |
| | If AC is less than TC then light green while risk is depressed |
| | Return to Loop |
| RISK & RESET: | Light yellow for data dump |
| | With each risk, display bit status of AC and TC with green = 0 and red = 1 |
| | At end, if risk is pressed, then return to Loop. |
| | If reset is pressed and momentarily held, then clear all of EEPROM |

A number of additional variations will now become apparent to persons skilled in the art. Reference should be made to the appended claims rather than the foregoing specification as indicating the true scope of the invention.

What is claimed is:

1. A detector for alpha particles produced by radioactive decay in a test medium, comprising:
    a solid state diode having a depletion layer disposed close enough to the test medium that alpha particles emitted in the test medium deposit energy in the depletion layer;
    a first amplifier connected to amplify a signal produced by the diode, the first amplifier being operable to produce an output pulse upon energy being deposited in the depletion layer;
    a second amplifier having at least one connection in common with the first amplifier, the second amplifier having inputs connected other than to the signal produced by the diode, whereby both the first and second amplifiers produce output pulses due to transients and only the first amplifier produces output pulses due to alpha particles; and,
    logic means operable to sense output pulses occurring on the first amplifier only, and to ignore output pulses occurring on both the first and second amplifiers.

2. The detector of claim 1, further comprising a threshold detector for the outputs of each of the first and second amplifiers, respectively, the threshold detectors producing output pulses when outputs of the first and second amplifiers exceed predetermined levels.

3. The detector of claim 2, wherein the predetermined levels are derived in part from a resistor/capacitor network connected to the outputs of the first and second amplifiers, whereby the predetermined levels vary with an average output level of the amplifiers.

4. The detector of claim 2, wherein the predetermined level for each of the threshold detectors is determined in part by a voltage divider connected to one input of an op amp having an inverting and non-inverting inputs, and further comprising a feedback circuit having a reactive element connected to an output of the threshold detector and to a second of the inputs of the op amp, the feedback circuit momentarily changing the predetermined level upon occurrence of the output pulse, whereby the threshold detectors produce single pulse outputs.

5. The detector of claim 4, wherein the predetermined level for the threshold detector connected to the second amplifier is slightly lower than the predetermined level for the threshold detector connected to the first amplifier.

6. The detector of claim 4, wherein the predetermined level is set just below a characteristic pulse height produced by radioactive decay of at least one of polonium 210, polonium 214 and polonium 218, occurring directly on a surface of the solid state diode.

7. The detector of claim 1, wherein the first and second amplifiers are op amps, each having an inverting input and a non-inverting input, the non-inverting inputs of the first and second amplifiers being connected together and to ground through a capacitor, the first amplifier having a further capacitor, the further capacitor being connected in series with the diode and a resistor, between the non-inverting and inverting inputs of the first amplifier, whereby the diode is substantially unbiased.

8. The detector of claim 1, wherein the logic means includes a microprocessor responsive to the output pulses of the first amplifier, the microprocessor being operable to count pulses occurring exclusively on the first amplifier, and also to count time intervals, the microprocessor being operable to compare a total of pulses of time intervals to a pre-selected level of exposure to the radioactive decay, and to produce an output indicating a result of such comparison.

9. The detector of claim 8, wherein the microprocessor is operable to produce additional outputs for control of means for mitigating esxposure to said radioactive decay.

10. The detector of claim 1, further comprising a conductive enclosure at least partly surrounding the diode, the conductive enclosure being positively biased relative to the diode, whereby positively charged radon daughter ions are drawn to and plated onto the diode.

11. The detector of claim 10, further comprising a dust filter preventing ingress of dust and solid particles into an area enclosed by said conductive enclosure.

12. A radon detector responsive to alpha emissions of radon daughters, comprising:
    a solid state diode sensor element havinga depletion layer disposed close enoughto a surface exposed to a test sample that alpha particles produced by radioactive decay adjacent the surface deposit energy in the depletion layer, the sensor element being at least one low cost standard grade photovoltaic diode;
    an enclosure partly surrounding the sensor element including a conductive shell, ambient gases diffusing into the enclosure, the conductive shell and the sensor being biased at a low DC voltage to produce a low DC voltage gradiant more positive on the conductive shell, whereby positively charged ions including radon daughters in the immediate vicinity of the sensor are drawn to the sensor and alpha decays of the radon daughters adjacent the sensor tend to occur directly on the sensor;

a voltage sensitive amplifier operable to amplify a voltage pulse in the sensor element occurring due to said energy deposited in the depletion layer, and to produce an amplified pulse; and, at least one threshold detector operable to discriminate amplified pulses from the sensor element according to pulse level, the level being chosen high eneough to exclude alpha emissions characteristic of radon decay remote from the sensor element and to include alpha emissions characteristic of decay of radon daughters immediately on the sensor.

13. The detector of claim 12, further comprising a dust filter partly defining the enclosure for the sensor element, the dust filter preventing ingress of dust and solid particles into the enclosure, the ambient gases diffusing through the filter into the enclosure.

14. The detector of claim 12, further comprising means to count pulses discriminated by the threshold detector and to compare a counted pulse rate to an expected pulse rate, the expected pulse rate representing a background pulse count plus a pulse count at a predetermined level of radon exposure.

15. The device of claim 12, further comprising means responsive to said threshold detector for controlling connection of power to means for mitgating a radon hazard detected by the device.

16. The radon detector of claim 12, wherein the threshold detector is operable to discriminate output pulses by levels characteristic of energy levels emitted during radioactive decay of at least one of polonium 210, polonium 214, and polonium 218, occurring directly on the surface of the sensor element.

17. The detector of claim 16, wherein the threshold detector is operable to discriminate for output pulses having levels characteristic of radioactivedecay of polonium 218 plated on a surface of the sensor element.

18. The detector of claim 16, further comprising means to count discriminated pulses and to compare an actual count to an expected count for a known radon concentration, plus a background count.

19. The detector of claim 12, wherein the sensor element is connected to the detector without use of lead solder, and further comprising means for spacing the sensor element in the enclosure, at a space from other circuit elements.

20. The detector of claim 12, further comprising
a logic and timing means operable to count pulses discriminated by said threshold detector and to determine lapse of time, the logic means having means defining a test interval, operative to count a number of said pulses up to a maximum pulse count and operative to sense lapse of time up to a maximum time interval, the maximum pulse count and the maximum time interval being a pulse count and a time interval chosen to reach a predetermined statistical confidence level respecting a concentration of radon at a given threshold concentration in sampled air in the enclosure, and wherein reaching the maximum pulse count prior to the maximum time interval is arranged to initiate an at-risk indicating condition and reaching the maximum time interval prior to the maximum pulse count is arranged to initiate a safe indicating condition, whereupon the pulse count and the sensed time are reset.

21. The radon detector of claim 20, wherein the given threshold concentration is one of a plurality of threshold concentrations selectable by switch inputs to the logic and timing means.

22. A radon detector responsive to alpha emissions of radon daughters, comprising:
a solid state diode sensor element having a depletion layer disposed close enough to a surface exposed to a test sample that alpha particles produced by radioactive decay adjacent the surface deposit energy in the depletion layer;

an enclosure partly surrounding the sensor element including a conductive shell, ambient gases diffusing into the enclosure, the conductive shell and the sensor being biased to produce a DC voltage gradiant more positive on the conductive shell, whereby positively charged ions including radon daughters are drawn to the sensor;

at least one threshold detector operable to discriminate pulses produced by the sensor element according to pulse level, the level being chosen high enough to exclude alpha emissions characteristic of radon decay remote from the sensor element and to include alpha emissions characteristic of energy levels emitted during radioactive decay of at least one of polonium 210, polonium 214 and polonium 218, occurring directly on the surface of the sensor element;

means to count discriminated pulses and to compare an actual count to an expected count for a known radon concentration, plus a background count; and, means for increasing the expected background count over time, such that a count reflecting radioactive emissions of previously-plated radon daughters on the sensor element are added to correct the background count.

23. A radon detector responsive to alpha emissions of radon daughters, comprising:
a solid state diode sensor element having a depletion layer disposed close enough to a test sample that alpha particles produced by radioactive decay in the test sample deposit energy in the depletion layer;

an amplifier connected to amplify pulses produced by the sensor element due to the energy deposited in the depletion layer;

a threshold detector operable to discriminate amplified pulses from the amplifier as pulses in a predetermined pulse height range;

a logic and timing means operable to count the pulses in the predetermined pulse height range and to determine lapse of time, the logic means having means defining a test interval, operative to count a number of said pulses up to a maximum pulse count and operative to sense lapse of time up to a maximum time interval, the maximum pulse count and the maximum time interval being a pulse count and a time interval chosen to reach a predetermined statistical confidence level respecting a concentration of radon at a given threshold concentration in sampled air in the enclosure, and wherein reaching the maximum pulse count prior to the maximum time interval is arranged to initiate an at-risk indicating condition and reaching the maximum time interval prior to the maximum pulse count is arranged to initiate a safe indicating condition, whereupon the pulse count and the sensed time, are reset, the logic and timing means further comprising at least two registers for long term risk assessment, one of the registers accumulating pulse counts and the other of the registers accumulating a count of long term risk assessment intervals, said long term risk assessment intervals being equal to an average lapse of time between pulses at the given threshold concentration, whereby a comparison of contents of the registers reflects average concentration over and under the given threshold concentration.

24. A radon detector, comprising:

means for producing and counting pulses responsive to alpha decay of at least one of radon and radon daughters;

means for producing and counting pulses representing lapse of time; and, logic and timing means operative to count alpha decay pulses up to a predetermined maximum pulse count and operative to sense lapse of time up to a maximum time pulse count, the maximum pulse count and the maximum time interval being a pulse count and a time interval chosen to reach a predetermined statistical confidence level respecting concentration of radon at a given threshold concentration, reaching the maximum pulse count prior to the maximum time interval representing a concentration at least equal to the threshold concentration, the logic and timing means comprising at least two registers for long term risk assessment, one of the registers accumulating alpha decay pulse counts and the other of the registers accumulating a count of long term risk assessment intervals, said long term risk assessment intervals being equal to an average lapse of time between pulses expected at the given threshold concentration, whereby a comparison of contents of the two registers reflects average concentration over and under the given threshold concentration.

25. A radon detector, comprising:

means for producing and counting pulses occurring due to alpha decay of at least one of radon and radon daughters in a test sample, a count of said pulses over time including a background due to pulses apart from radioactive decay of radon and radon daughters in said test sample, a background count being predetermined from at least one of an estimated and a measured background count;

logic and timing means operable to determine when said count, exclusive of the background count, exceeds a level representing a predetermined concentration of radon; and, means for increasing the background count over time to account for alpha emissions of radon daughters from previous test samples plating out on the detector and there accumulating over time.

26. The detector of claim 25, wherein the background count is increased in proportion to a total number of counts accumulated by the detector.

* * * * *